United States Patent
Wicks et al.

(10) Patent No.: US 6,420,457 B1
(45) Date of Patent: Jul. 16, 2002

(54) MICROWAVE TREATMENT OF VULCANIZED RUBBER

(75) Inventors: George G. Wicks; Rebecca L. Schulz, both of Aiken, SC (US); David E. Clark; Diane C. Folz, both of Gainesville, FL (US)

(73) Assignee: Westinghouse Savannah River Company, LLC, Aiken, SC (US)

( * ) Notice: Subject to any disclaimer, the term of this patent is extended or adjusted under 35 U.S.C. 154(b) by 0 days.

(21) Appl. No.: 09/542,201

(22) Filed: Apr. 4, 2000

(51) Int. Cl.$^7$ .................................................. C02K 3/04
(52) U.S. Cl. ...................... 523/300; 521/41; 524/492; 524/495
(58) Field of Search ............................... 524/492, 495; 523/300; 521/41

(56) References Cited

U.S. PATENT DOCUMENTS

| | | |
|---|---|---|
| 4,104,205 A | 8/1978 | Novotny et al. |
| 4,332,700 A | 6/1982 | Munih |
| 4,341,667 A | 7/1982 | Lal et al. |
| 4,456,688 A | 6/1984 | Dugan et al. |
| 4,469,573 A | 9/1984 | Minih |
| 4,469,817 A | 9/1984 | Hayashi et al. |
| 4,647,443 A | 3/1987 | Apffel |
| 4,665,101 A | 5/1987 | Ficker |
| 4,770,741 A | 9/1988 | Day |
| 5,120,767 A | 6/1992 | Allard et al. |
| 5,258,413 A | 11/1993 | Isayev |
| 5,275,948 A | 1/1994 | Straube et al. |
| 5,284,625 A | 2/1994 | Isayev et al. |
| 5,358,869 A | 10/1994 | Kilbane, II |
| 5,362,759 A | 11/1994 | Hunt et al. |
| 5,387,523 A | 2/1995 | Monticello |
| 5,458,752 A | 10/1995 | Lizama et al. |
| 5,506,123 A | 4/1996 | Chieffalo et al. |
| 5,510,265 A | 4/1996 | Monticello |
| H1531 H | 5/1996 | Blumentals et al. |
| 5,578,700 A | 11/1996 | Hunt et al. |
| 5,597,851 A | 1/1997 | Romine et al. |
| 5,849,970 A | 12/1998 | Fall et al. |
| 5,897,996 A | 4/1999 | Kimbara et al. |

OTHER PUBLICATIONS

Section on "Rubber Recycling Emphasis", *Rubber & Plastics News*, Oct. 7, 1996, pp 9, 11, 12, 13, 15, 16, 18–27.

"Microbial Processing of Waste Tire Rubber", Robert A. Romaine, Margaret F. Romine & Lesley Snowden–Swan, Pacific Northwest Laboratories, Richland, WA, presented at the Rubber Division, American Chemical Society, Cleveland, OH, Oct. 17–20, 1995 (15 pages total).

*Primary Examiner*—Edward J. Cain

(57) ABSTRACT

A process and resulting product is provided in which a vulcanized solid particulate, such as vulcanized crumb rubber, has select chemical bonds broken by microwave radiation. The direct application of microwaves in combination with uniform heating of the crumb rubber renders the treated crumb rubber more suitable for use in new rubber formulations. As a result, larger particle sizes and/or loading levels of the treated crumb rubber can be used in new rubber mixtures to produce recycled composite products with good properties.

13 Claims, No Drawings

MICROWAVE TREATMENT OF VULCANIZED RUBBER

BACKGROUND OF THE INVENTION

1. Field of the Invention

The present invention relates broadly to the treatment and recycle of rubber products and still more particularly to the use of recycled crumb rubber. The United States Government has rights to this invention pursuant to contract number DE-AC09-96-SR18500 between the U.S. Department of Energy and Westinghouse Savannah River Company.

2. Discussion of Background

Existing efforts to recycle used rubber, in particular used tires, into new rubber articles, especially tires, have met with only limited commercial success. In the United States alone, there are currently billions of tires stock-piled in long term storage with additional millions being added annually to such stock piles. Because of the large volume involved with tires, this discussion will be directed to tires although much of these comments are applicable to other new and used rubber products.

Because used rubber is usually processed in the form of crumb rubber, references herein will be to rubber in that form. A major limitation in the recycling of used tire material is that the used tire rubber can not be readily mixed in economical proportions to form new tire polymer mixes having acceptable properties.

During the vulcanization process of rubber, such as in the manufacture of new tires, accelerators, promoters, and/or initiators, are used and the formation of large numbers of sulfur crosslinks are established and are inherent in the cured rubber. It is generally believed in the art that the sulfur compounds which are present in used rubber, such as tire rubber, are deleterious in a subsequent curing process which uses used rubber as a component in a new polymer mixture. Formulations of tire rubber which use more than minor amounts of a used, previously vulcanized rubber result in a brittle cured end product unsuitable for many uses such as automobile or truck tires. Heretofore, efforts to reclaim scrap rubber have primarily included a physical sheering process which is suitable for a rubber which can be mixed with asphalt, forming asphalt rubber. Such use is taught in U.S. Pat. No. 5,304,576.

It is also known to take used rubber and depolymerize the vulcanized rubber in an organic solvent and then recover various polymerized fractions as taught in U.S. Pat. No. 5,438,078. Similarly, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. U.S. Pat. No. 5,369,215 teaches a similar process in which used tire material may be depolymerized under elevated temperatures and at a reduced pressure to recover the monomeric compounds.

U.S. Pat. No. 5,891,926, which is incorporated herein by reference, is directed to a devulcanization process for used rubber in which elevated temperatures and pressures are used to partially devulcanize the rubber. Thereafter, a solvent 2-butanol is used to extract the devulcanized rubber from the non-rubber and/or solids component.

U.S. Pat. No. 4,104,205 teaches a method to devulcanize rubber from hose end trim and butyl tire bladders. While tire tread material was also treated, difficulties in exothermic reactions and physical properties of the microwaved materials were noted.

U.S. Pat. No. 4,341,667 teaches that the green strength of elastomers reclaimed through heat, microwave, chemical treatments, or physical shearing can be improved by the addition of butene polymers.

U.S. Pat. No. 4,469,817 teaches the microwave treatment of a vulcanized rubber. The treatment uses microwaves to raise the temperature of the rubber to a devulcanization temperature followed by rapid cooling with water.

U.S. Pat. No. 4,665,101 is an improvement to convectional heating of used rubber where microwave heating is additionally used. The combination of the heating methods is used to provide a more uniform heating profile and avoid extremes of localized temperatures within the treated material.

This application also relates to commonly assigned U.S. application having Ser. No. 09/542,392 having Attorney Docket No. WSR-14R, "Combination Biological and Microwave Treatments of Used Rubber Products", filed on Apr. 4, 2000 and which is incorporated herein by reference. Additionally, commonly assigned application Ser. No. 09/542,744 having Attorney Docket No. WSR-15R, entitled "Microbial Processing of Used Rubber", filed on Apr. 4, 2000, is incorporated herein by reference.

There remains a strong need for a practical, economical system for processing used tire parts such as tread rubber into a material which can be incorporated at a substantial loading level into new rubber compounding mixtures having good mechanical and chemical properties.

SUMMARY OF THE INVENTION

The present invention is a process and the resulting product of the process in which used rubber having relatively high surface reactivity has the reactive agents (as well as sulfur crosslinks) altered such that the resulting treated rubber may be incorporated into polymer mixes for high quality new rubber products, including tires, at much greater levels than used heretofore.

It is a further object of the present invention to provide a process and resulting product which permits the incorporation of large particle sizes of previously vulcanized rubber into polymer mixes for new rubber products.

In accordance with this invention, it has been demonstrated that particles of used crumb rubber can be treated with microwave energy which effectively alters the surface chemistry and reactivity of the so treated vulcanized crumb tire rubber. It has been found that the microwave treatment of the crumb rubber particle affects the surface reactivity of the crumb rubber particles to an extent that the rubber particles can be integrated into a new tire polymer mix at much higher levels than previously possible. The microwave treatment of the crumb rubber can be controlled so as to target only specific types of chemical bonds or agents by the selection of desired processing conditions, such as time and temperature, of the microwave bombardment. It has been found that the crumb rubber so treated is compatible with the new rubber polymer component of a tire mix.

The use of microwaves to target and modify select chemical species or bonds provides a process which can be carried out on an economical basis. The process is thought to be particularly useful in that the microwave treatment alters a wide variety of chemical additives used by tire manufacturers and which are present within the used rubber. The ability to target or alter these chemical constituents further enhances the usefulness and compatibility of the treated used rubber with virgin polymer.

In addition, the microwave treatment treats both the surface and interior bulk of the crumb rubber particle. While the surface treatment is believed necessary to bring about favorable co-compounding of used, previously vulcanized rubber with new tire rubber formulations, the microwave treatment is further believed to bring about favorable changes within the interior of the rubber particles. As used herein, the term "bulk treatment" means the treatment of solid rubber particle with microwaves such that interior heating of the rubber particle occurs. The combination of heat and microwave radiation is believed to favorably alter the interior of the crumb rubber particles by the alteration of certain chemical constituents. As a result, a more uniform feed stock is provided and results in a crumb rubber product which is "sterilized".

The use of the microwave treatment provides the potential of yielding a process and product which can be obtained on an economical basis at a commercial scale and in an environmentally acceptable manner.

It is thus an object of this invention to provide a microwave treatment process which alters by an effective amount the reactivity of used crumb rubber such that an increased amount of used crumb rubber can be mixed with a new tire polymer mix.

It is another object of this invention to provide a crumb rubber having an improved surface and bulk chemistry suitable for use in compounding a new tire rubber mix.

It is yet another object of this invention to provide a compounded rubber mix containing increased amounts of used crumb rubber.

It is yet another object of this invention to provide a treated rubber particle having a large size which may be incorporated into new rubber mix and provides a useful compounded final rubber product.

It is a further object of this invention to provide a process of devulcanizing a rubber particulate in which the devulcanization is substantially limited to targeted chemical bonds and which leaves certain desired physical properties of the particulate unaffected and or improved.

It is a further object of this invention to provide a process and material which increases the used rubber content of a molded rubber article while simultaneously improving the chemical and physical properties of the article.

These and other objects of this invention are provided by a process for devulcanizing and/or otherwise altering or modifying scrap rubber comprising: providing a supply of crumb rubber, said crumb rubber having a plurality of carbon-sulfur (C—S) and sulfur-sulfur (S—S) bonds; exposing the crumb rubber to microwave radiation having a frequency of 2450 MHZ; rendering an effective amount of the C—S and S—S bonds inactive; thereby, providing a crumb rubber having a treated surface defining an altered chemical state, the altered state being suitable for incorporation into a new rubber formulation and curing into a new rubber product.

DETAILED DESCRIPTION

A process for treating the crumb rubber is based upon the selection of a preferred frequency range of microwave energy which targets select chemical bonds. In particular, sulfur-carbon (S—C) and sulfur-sulfur (S—S) bonds of the crumb rubber are targeted by the microwave radiation at 2450 MHZ, though other microwave frequencies approved for use in countries other than the U.S. are also useful. Further, the raised temperature of the crumb rubber further facilitates the treatment of the crumb rubber. The microwave heating which results from the internal friction of polar molecules appears superior to externally supplied heat sources. The combination of heat and direct microwave irradiation is believed to destroy other constituents contained within the rubber particle, such as some accelerators, anti-oxidants, and stabilizers. Removal of these other constituents, particularly from the surface of the crumb rubber, improves the quality of the treated crumb rubber product for use in new rubber formulations.

In the initial vulcanization of tire rubber, sulfur and sulfur containing compounds, such as accelerators and initiators, are added which crosslink with the tire polymer. The bonding and crosslinkage stabilizes the polymer matrix, which imparts important desired properties to the rubber and increases the useful life of the tire. The presence of the sulfur compounds, and various additives present within used tire rubber, has limited the quantities of used tire rubber employed in new tire mixes. The sulfur containing compounds typically present on the rubber result in a final cured product which is often brittle and has other properties which make it unsuitable for many uses and especially for use as a tire.

As used in the present invention, the term "devulcanized" is used to indicate that certain surface and bulk properties of the particulate crumb rubber have been chemically altered by the application of microwave radiation. It is believed that the surface activity of mono, di, and polysulfides which formed polymer cross linkages during the initial vulcanization process have been reduced by the present microwave treatment process. As such, the crumb rubber is referred to here as "devulcanized" though it is understood that a substantial number of vulcanization products persist in the treated crumb rubber and in fact remain beneficial in the overall reformulations of new rubber mixes with the treated crumb rubber. Again, it is to be understood that other chemical and/or physical changes may take place which have a beneficial effect on the used rubber in reformulating it into new rubber products.

The work herein uses 40 mesh crumb truck tread rubber conforming to ASTM standard D5603. The crumb rubber was obtained from a commercial supplier of crumb rubber and is believed to represent a heterogenous mixture of different tire formulations from a variety of manufacturers. It is believed that the crumb rubber can be used over a wide range of particulate sizes, and the process is not size dependent upon the crumb rubber used. For example, standard sizes of 200–40 mesh, tire tread buffings, and even larger particles are believed to be useful.

The ASTM standard crumb rubber material used in the procedures set forth below was obtained from used truck treads. It is readily appreciated by those having ordinary skill in the art that crumb rubber originating from used passenger or truck tires will typically encompass products originating from many manufacturers and comprising a wide assortment of chemical constituents and compositions. Accordingly, a wide variety of different chemicals are expected to be present on the surface of untreated crumb rubber. This is particularly true for the reactive sulfur compounds originally added to the rubber during the vulcanization process. The present invention provides a treatment process which effectively modifies broad classes of reactive chemical constituents associated with the surface and bulk of crumb rubber. Accordingly, the treatment process will address expected variations encountered in a commercial source of crumb rubber.

The examples below are intended to illustrate the present invention. The descriptions in no way limit the scope of the present invention.

In the examples, the properties of the combination of crumb and new tire/virgin rubber samples are evaluated as follows:

Plasticity: Measurements carried out in accordance with ASTM Standard D1646.

Scorch: (t5, t35) Measurements carried out in accordance with ASTM Standard D1646.

Minimum Viscosity: Measurements carried out in accordance with ASTM Standard D1646.

Shore Hardness: Measurements carried out in accordance with ASTM Standard D2240.

Modulus of elongation at 300% and 100%: Measurements were carried out in accordance with ASTM Standard D412, test method A.

Tensile Strength: Measurements were carried out in accordance with ASTM Standard D412, test method A.

Elongation @ Break: Measured as a percentage value according to ASTM standard D412, test method A.

Energy @ Break: Measurements carried out in accordance with ASTM Standard D412, test method A and set forth in units of MPa.

G': Measurements carried out in accordance with ASTM Standard D2221.

Tan Delta: Hysteresis is expressed by the measurement of tan delta @ 10 percent deformation and at 23 degrees C in accordance with ASTM Standard D2231.

Analytical Characterization:

The analytical results set forth in Table 1 and discussed further below are based upon standard ASTM measurements as set forth below.

Acetone extract measurements were made according to ASTM Standard D297-18, 19.

Oxygen measurements were made using commercially available oxygen analyzers.

Polymer ratios were determined according to ASTM Standard D3677.

Macro ash measurements were made according to ASTM Standard D297-37.

EXAMPLE 1

A general protocol found useful in the present treatments is described below. Samples of 40 mesh crumb rubber ranging from 30–300 grams where subjected to power levels of between 10–100% (85–850 Watts) in a 850 Watt, 2450 MHZ microwave oven lined with refractory materials. In some instances, a susceptor was used to more uniformly heat the crumb rubber and an inert atmosphere of nitrogen gas was used to regulate the treatment process and prevent excessive oxidation. Temperature levels for the samples treated ranged from room temperature to 500 degrees centigrade.

Following treatment times which varied from 4–60 minutes, the samples were removed and evaluated. The physical properties of the treated crumb rubber ranged from a completely pyrolized end product at the extreme time/power levels to the less strenuous treatments which more nearly resembled the starting material. Further analysis was made of samples which retained a substantial particle size and had a tendency to clump together. The clumping or "stickiness" of the treated crumb rubber is generally believed indicative of materials which will co-process well with virgin polymer.

A target temperature of 360° C. to 380° C. has been found to work well. Such a temperature can be maintained over the treatment time intervals reported above with no apparent loss of desired properties. The 360–380° C. temperature range seems effective at modifying the S—S and C—S bonds within the crumb rubber.

Samples were further evaluated by incorporating the treated samples into a literature formula tread composition (Bierkes) followed by a Banbury test. Loading levels of treated crumb rubber at 12% (not reported) and 20% load levels were made by incorporating the treated crumb rubber into a masterbatch mix and mixing the materials in the mill. For example, a 20% loading of treated crumb rubber utilized a 160 gram loading of treated crumb rubber to 800 grams of masterbatch mix. The uncured and cured properties of the composite formulations were measured as set forth above and as reported in Table 1 along with data from appropriate control mixes.

Results

While not separately reported, similar improvements in the treated rubber properties were noted at 12% loading levels of treated crumb rubber as well as treated used truck tire tread buffings.

Without undue experimentation, one having ordinary skill in the art can use the above described protocol and evaluate the effectiveness of a particular used rubber source and treatment regime. The effectiveness of the treatment process can be measured in terms of comparative values of polymer mixes evaluated with Banbury tests. As illustrated in the tables, comparative values are set forth for new tire rubber compounds, tire compounds having untreated crumb rubber, and tire compounds having treated crumb rubber added to the compound. While the Banbury test is appropriate for tire tread mixtures, other comparative tests may be adopted which may be indicative of the desired parameters needed for the crumb rubber. For instance, rubber hoses, gaskets, or other cured articles can be provided using the treated crumb rubber as a polymer component. Evaluation techniques of various treatment conditions would then follow the particular evaluation techniques commonly followed within the appropriate art field.

As shown in Table 1, various uncured properties, cured properties, and analytical characterization of various rubber compounds are set forth. The compounds evaluated include a new tire rubber having no crumb rubber added, a 20 percent untreated crumb rubber compound, and four (4) different compounds having a 20 percent microwave treated crumb rubber component as treated under various conditions. The crumb rubber used in the evaluations reported in Table 1 is a 40 mesh truck tread crumb rubber. The four (4) microwave treated samples set forth, going from left to right, were treated at a temperature of 360° C. for four (4) minutes, 380° C. for four (4) minutes, 360° C. for eight (8) minutes, and 380° C. for eight (8) minutes, respectively.

From the data presented in Table 1, the blending of 20 percent untreated crumb rubber with new tire rubber results in a rubber compound in which key physical properties are significantly deteriorated. In contrast, the microwave treatment process recovers some of the original properties. The "Delta" value in Table 2 sets forth the percentage of the loss in properties observed in the untreated crumb rubber compound that is regained in the treated crumb rubber compound. Thus, the Delta value of the treated compound that showed no improvement over the untreated compound would be zero percent. The Delta value of the treated compound that achieved the same properties as all new tire rubber would be 100 percent. It is noteworthy that three (3)

of the four (4) samples for elongation Q break values indicate values greater than 100 percent, indicating that this property of the treated crumb rubber compound was better than the property value of the new tire rubber compound. It is also noteworthy that significant recoveries of the plasticity, tensile strength, and energy at break were also obtained. It should also be noted that the new tire rubber compound values used for these Delta calculations are conservative and are within a range of values for new tire rubber compound samples that were tested.

The Delta values for Table 2 are calculated as follows:

Delta =[(Value of 20% treated compound)–(value of 20% untreated rubber compound)] divided by [(Value of now tire rubber compound)–(value of 20% untreated rubber compound)]

The present invention provides an improved crumb rubber which can be compounded into a cured rubber product having improved properties when compared to similar formulations using untreated crumb rubber. The-microwave treatment significantly improves certain properties such that the microwave-treated crumb rubber compositions achieve properties closer to that of a new tire rubber. The improvement is the result, in part, of the altered surface chemistry of the treated crumb rubber. The treated surfaces of the crumb rubber favor useful co-polymerization with new polymer stocks. Further, the microwave treatment also brings about favorable changes to the bulk interior properties of the treated rubber particles. As a result, the overall cured composition has many improved qualities over similar compounds using untreated crumb rubber.

It is important to note that the treated crumb rubber was evaluated at levels of 12 and 20% loadings. The favorable results obtained at both loading levels suggest that loading levels of between 25–30%, or up to 50% or higher, may be used in tire or non-tire applications and still obtain a desirable cured end product. It should also be noted that additional improvements are obtainable by selection of a desired size of crumb rubber for treatment and use. A relatively large sized 40 mesh crumb rubber particle was used in the present studies. However various advantages may be gained by varying the particle size. For instance, tire tread buffings have been evaluated using the procedures set forth above and have suggested similar positive results when incorporated into a cured rubber. Larger size particles offer an ability to make use of the existing cured rubber properties which are present within the interior of the treated crumb rubber particle. Further, the larger particle size may reduce processing costs associated with the microwave treatment. The treated crumb rubber has, among other attributes, an altered surface chemistry. The desirable internal physical properties of the treated crumb rubber are believed largely unchanged and may be used to advantage without having the costs associated with all new polymer materials. As a result, the improved chemical reactivity for the treated crumb rubber is obtained without substantially diminishing the desired physical properties which were pre-existing in the crumb rubber. The treated crumb rubber interior is believed to retain the desirable physical and rheological properties which are compatible for reformulation with a new tire polymer mix. One of ordinary skill in the art of rubber compounding and rubber compositions will readily appreciate that the treated crumb rubber can be used at greater relative quantities than the untreated crumb rubber in new rubber mixes. As a result, a rubber formulation for a new tire can make use of an increased amount of treated crumb rubber. Such a formulation enables a lower cost tire and makes use of a recycled resource which remains under utilized.

One limiting factor which has heretofore precluded higher levels of crumb rubber involves the presence of sulfur functional groups on the surface of the crumb rubber. By targeting the sulfur constituents in the microwave treatment process, one can achieve a treated crumb rubber which may be used at higher loading levels in new tire mixes without compromising the other physical properties of the crumb rubber.

The duration of the microwave treatment of crumb rubber to achieve a crumb rubber product having improved chemical reactivity for commercial operation is readily determined by routine experimentation. Once the other operating parameters are selected, the extent of treatment can be determined by performing the treatments for different durations and concentrations until a satisfactory crumb rubber is obtained as determined by use in compounding a new rubber formulation and/or by other tests described herein.

The devulcanized crumb rubber of the present invention may be used with a variety of tire tread and tire tread cap rubber compositions such as those taught in U.S. Pat. No. 5,378,754, and U.S. Pat. No. 5,023,301, which are incorporated herein by reference. For instance, the devulcanized crumb rubber may be blended with a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, and mixtures thereof. The rubber may further contain a filler, such as carbon black, silica, and combinations thereof. The rubber and filler may then be blended with a desired amount of the devulcanized rubber. The devulcanized rubber provides a sulfur curable exterior surface allowing a useful cured rubber composition to be provided suitable for tire treads.

It is also believed that in addition to useful tread compositions, for a tread base or a tread cap, the devulcanized used rubber described in the present invention may be useful in compositions used in other tire applications such as sidewalls, beads, carcass plies, and belts.

It is well within the skill level of one in the art to prepare polymer mixtures of which the devulcanized rubber particulates may be added during a compound mixing stage. Further, it is well known in the art how to construct a conventional pneumatic tire having a tread comprised of a blend of natural rubber and solution-polymerized styrene/butadiene copolymer rubber (SBR). As taught in the current invention, substantial loading levels of devulcanized crumb rubber may be incorporated into the polymer mix prior to the production of a tire. In general, one would expect that the ground contacting surfaces of a tire tread having the devulcanized crumb rubber substituted for a portion of a non-reinforcing filler to have an improved rolling resistance, or fuel economy, as compared to a tire made having a tread compound which uses carbon black or silica as a filling agent.

For certain articles such as belts, hoses, or shoe treads, it may be possible to use a 100% treated crumb rubber content for such articles.

In applications such as tires, a formulation having a higher percentage of crumb rubber may enable a lower cost tire. At the very least, a greater use of a recycled resource is achieved. Further, the crumb rubber treatment process provides an opportunity to add a filler having reinforcing properties to various components of a tire. While the data discussed above is directed primarily to tire tread formulations, a reinforcing filler such as crumb rubber may have utility in sidewall formulations and other compounded rubber portions of a cured tire.

Likewise, extensive use is made of rubber bladders in the tire manufacturing process. Such bladders may be constructed, at least in part, of a treated crumb rubber.

Additionally, the prior art use of particulate crumb rubber and various treatment protocols for modifying the crumb rubber often teaches the use of an extremely fine, powder-like particulate. The present invention has been found suitable for use with both fine and much larger particles. The use of the large particles is believed to afford technical and economic advantages in resulting cured compositions in tires and other molded rubber products.

It is also envisioned that selected shapes of vulcanized crumb rubber can be treated with the above procedure to produce a treated reinforcing filler and which further provides a useful shape. For instance, while not separately reported herein, favorable formulations similar to those set forth above have been suggested using tire tread buffings. The buffings have a substantially greater length than width and may therefore impart additional physical characteristics to a polymer mix based upon their size and dimension and may be more economical to use.

Heretofore, crumb rubber recycling efforts have been directed toward a randomly shaped particle size. The present technology affords the opportunity to select a particular length, diameter, geometric shape in which the selected shape offers enhanced attributes in the tire construction. The selected non-random shape which may be stamped or formed from larger segments or pieces of rubber, may have varying attributes of hardness, elasticity, or other cured properties which, being preserved in the treatment and subsequent polymerization process, will impart the original mechanical properties to the resulting mix.

For instance, a treated crumb rubber having a selected shape and/or other physical property, such as hardness, may be blended in with a tread polymer to provide a heterogeneous tread mixture which incorporates therein intact particles of the treated crumb rubber. The properties of such a mixture may be advantageously different than a homogeneous mixture of polymers.

In summary, the present invention provides an improved and economical process for treating crumb rubber to provide a treated crumb rubber having improved chemical and reactive properties. These improved properties permit the crumb rubber to be incorporated at higher loading levels than untreated crumb rubber when used in new tire polymer formulations. The ability to target chemical moieties (i.e., polysulfides) on the used rubber surface is thought to provide an improved crumb rubber for use in tire polymer formulations, thereby allowing the treated crumb rubber to be used in new rubber mixes. The treatment process, in part, affects the surface of the crumb rubber while the useful mechanical and physical properties already inherent in the crumb rubber are maintained. Such properties are, of course, consistent with those needed for a tire given the source of the crumb rubber.

Likewise, recycled rubber particulate from any common source material, i.e., hoses, belts, gaskets, shoe soles, etc. upon treatment with microwaves, can be incorporated using larger sizes and/or at a higher level in like products than untreated crumb rubber.

In view of the foregoing disclosure and examples, it is well within the ability of one skilled in the relevant art to make modifications and variations to the disclosed embodiments and examples, including the use of equivalent and even dissimilar materials and process steps without departing from the spirit of the invention.

TABLE 1

|  | New Tire Rubber | 20% Untreated Crumb Rubber | 20% Microwave-Treated Crumb Rubber Compound | | | |
| --- | --- | --- | --- | --- | --- | --- |
|  | Compound | Compound | 403604 | 403804 | 403608 | 403808 |
| Uncured Properties | | | | | | |
| Plasticity, Mooney units | 60.5 | 87.3 | 71.7 | 75.6 | 76.2 | 73.8 |
| Scorch | | | | | | |
| (t5), minutes | 24.58 | 20.26 | 22.55 | 23.57 | 23.95 | 24.15 |
| (t35), minutes | 28.62 | 24.47 | 26.37 | 27.42 | 28.32 | 28.60 |
| Min. Viscosity, Mooney units | 41.24 | 62.67 | 49.03 | 52.25 | 52.47 | 50.97 |
| Cured Properties | | | | | | |
| Shore Hardness | 67.7 | 66.1 | 68.2 | 70.4 | 67.0 | 67.9 |
| Modulus at 100%, MPa | 2.43 | 2.02 | 2.17 | 2.51 | 2.12 | 2.20 |
| Modulus at 300%, MPa | 3.44 | 2.66 | 2.53 | 2.91 | 2.72 | 2.71 |
| Tensile Strength, MPa | 21.51 | 16.38 | 16.74 | 17.16 | 17.28 | 17.27 |
| Elongation @ break, % | 421 | 414 | 431 | 404 | 425 | 425 |
| Energy @ break, Joules | 16.64 | 12.54 | 14.29 | 13.47 | 13.86 | 13.95 |
| G' (10%), MPa | 2.679 | 2.935 | 3.24 | 3.45 | 3.06 | 3.17 |
| Tan delta | 0.288 | 0.275 | 0.291 | 0.301 | 0.289 | 0.295 |
| Analytical Characterization | | | | | | |
| Acetone Extract, % by weight | 10.34 | 10.26 | 10.82 | 10.89 | 11.25 | 11.37 |
| Oxygen, % by weight | 1.63 | 1.42 | 1.14 | 1.13 | 1.17 | 1.14 |
| Polymer ratio | 100 SBR |  | 3 NR/97 SBR | trNR/100 SBR | 3 NR/97 SBR | 3 NR/97 SBR |
| Zinc Oxide, % by weight | 2.79 | 2.55 | 2.00 | 2.07 | 1.95 | 1.94 |
| Macro Ash, % by weight | 3.01 | 3.44 | 3.80 | 4.20 | 3.77 | 3.95 |

TABLE 2

|  | 20% Microwave Treated Crumb Rubber Compound Delta Values | | | |
| --- | --- | --- | --- | --- |
|  | 403604 | 403804 | 403608 | 403808 |
| Plasticity | 58% | 44% | 41% | 50% |
| Tensile Strength | 7% | 15% | 17% | 17% |
| Elongation @ break | >200% | −143% | 157% | 157% |
| Energy @ break | 43% | 23% | 32% | 34% |

Delta =
[(Value of 20% treated compound) − (value of 20% untreated rubber compound)]
divided by
[(Value of a new tire rubber compound) − (value of 20% untreated rubber compound)]

That which is claimed is:

1. A process for devulcanizing a rubber particulate comprising:

providing a supply of a crumb rubber;

exposing the crumb rubber to microwave radiation;

raising the temperature of the crumb rubber to between about 350° C. and about 400° C.; and, altering compounds within the crumb rubber by the breakage of targeted bonds;

thereby, providing a crumb rubber having altered chemical and physical properties for incorporation into a virgin rubber mix.

2. The process according to claim 1 wherein the microwave frequency is 2450 MHZ.

3. The process according to claim 1 wherein the step of heating further comprises heating a susceptor material in proximity to the said crumb rubber.

4. A process for treating used rubber to render it suitable for use at high loading levels in a new rubber composition comprising:

treating the used rubber with microwave energy for a sufficient period of time to achieve predetermined reactivity properties when compounded into new rubber products.

5. The process according to claim 1 wherein the step of exposing the crumb rubber further comprises providing an atmosphere of inert gas.

6. The process according to claim 1 wherein said step of providing a supply of crumb rubber further comprises supplying crumb rubber having an average mesh size of at least 40.

7. A tire tread compound comprising:

a base polymer of natural or synthetic rubber;

a reinforcing filler comprising to about 30% by weight of a previously vulcanized particulate rubber, the particulate rubber having an exterior surface which is substantially devulcanized by exposure to a combination of microwave energy and radiant energy; and, a filler selected from the group of carbon black, silica, and combinations thereof.

8. A method of preparing a tire tread rubber composition comprising the sequential steps of:

blending a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, and mixtures thereof, said rubber further containing a filler selected from the group of carbon black, silica, and combinations thereof; and, blending in a plurality of rubber particulates, each particulate having a sulfur curable exterior surface produced by exposure to a combination of microwave energy and radiant energy, to form a rubber composition having a particulate concentration of at least about 20% by weight of said tire tread composition.

9. A cured molded article comprising:

about 10 to 50% by weight of a recycled crumb rubber particulate, said crumb rubber particulate having a modified outer particulate surface, the exterior surface produced by exposure to a combination of microwave energy and radiant energy;

about 10% to 90% by weight of a natural or synthetic rubber;

about 0% to 50% by weight of a non-reinforcing filler.

10. The molded article according to claim 9, wherein said crumb rubber particulate has an average size of at least about 80 mesh.

11. The molded article according to claim 9 wherein said crumb rubber particulate has an average size of at least about 40 mesh.

12. A process of combining particulate rubber with new rubber, comprising the steps of:

providing a plurality of particles of a vulcanized crumb rubber, the particles having an average particle size of between about 200 mesh to about 40 mesh;

oxidizing sulfur-containing vulcanization products on the surface of the crumb rubber particles with a combination of microwave radiation and radiant heat, the interior of the crumb rubber particles retaining desirable mechanical properties;

combining the surface oxidized particles with new rubber and forming chemical bonds between the new rubber and the surface of the oxidized rubber particles.

13. A reinforcing filler for use in tire polymer formulations comprising:

a tire rubber particle having an average size of about 200–40 mesh, the rubber particle having a sulfur curable exterior and a substantially vulcanized interior;

wherein when the rubber particle is blended with a tire polymer, the surface of the rubber particle forms cross-link bonds with the tire polymer.

* * * * *